Sept. 29, 1959          J. W. CASE          2,906,656

METHOD OF PRODUCING A GLASS-REINFORCED PLASTIC ARTICLE

Original Filed Oct. 4, 1954

INVENTOR
JAMES W. CASE

BY
ATTORNEYS

United States Patent Office 2,906,656
Patented Sept. 29, 1959

2,906,656

METHOD OF PRODUCING A GLASS-REINFORCED PLASTIC ARTICLE

James W. Case, Fairfax, Va.

Continuation of application Serial No. 460,281, October 4, 1954. This application November 16, 1956, Serial No. 622,716

7 Claims. (Cl. 154—90)

(Granted under Title 35, U.S. Code (1952), sec. 266)

The invention described herein may be manufactured and used by or for the Government of the United States of America for governmental purposes without the payment of an royalties thereon or therefor.

This invention relates to methods for the manufacture of plastic products.

More particularly, the invention concerns the method of producing a molded plastic material formed by arranging a plurality of coated glass fibers in parallel relationship, and in one or more layers united with a plastic bonding material to provide a unitary, glass-reinforced plastic sheet or panel.

My copending application Serial No. 338,924, filed February 25, 1953, discloses and claims a method and apparatus for coating such glass fibers as they emerge from a glass furnace. Patent No. 2,758,951 is directed to the plastic product. The present application is a continuation of application Serial No. 460,281, filed October 4, 1954, for Method of Producing a Glass-Reinforced Plastic Article, now abandoned, and is directed to the method of arranging the fibers in a particular relationship, such arrangement and relationship imparting strength, toughness, durability, and a higher glass content for a given thickness of product.

An object of the invention is to provide a method for the manufacture of plastic board, or plastic laminate, in which a novel step comprises the method of arranging and interrelating the reinforcing glass fibers incorporated in the product.

A second object of the invention is to provide a method of arranging a plurality of reinforcing glass fibers of varying thicknesses in a particular relation one to another so that the fibers of smaller thickness are interposed between adjacent fibers of greater thickness but in offset disposition with respect to lines joining said adjacent fibers at their central axes.

A third object is to provide a method of producing a plastic product incorporating a plurality of glass cylinders of reinforcing material, the cylinders being of varying cross-sectional area and so interrelated as to produce maximum glass content within the confines of the finished product.

A fourth object is to provide a method for the manufacture of plastic board, or plastic laminate, which method involves drawing from a glass furnace successive series of molten glass fibers of varying cross-sectional areas, winding said successive series of fibers upon a receiving drum, until the number of wound layers produces a desired thickness of glass upon the drum, then removing all of the glass from the drum by a longitudinal cut through all the layers, to permit the wound glass layers to be laid out on a plane surface, in the form of a mat, and finally applying to said glass mat a quantity of liquid filler material sufficient to unite the glass fibers into a single plastic entity by the penetration of the liquid filler into all of the spaces between successive fibers.

Other objects and many of the attendant advantages of this invention will be readily appreciated as the same becomes better understood by reference to the following detailed description when considered in connection with the accompanying drawings wherein.

Figure 1:
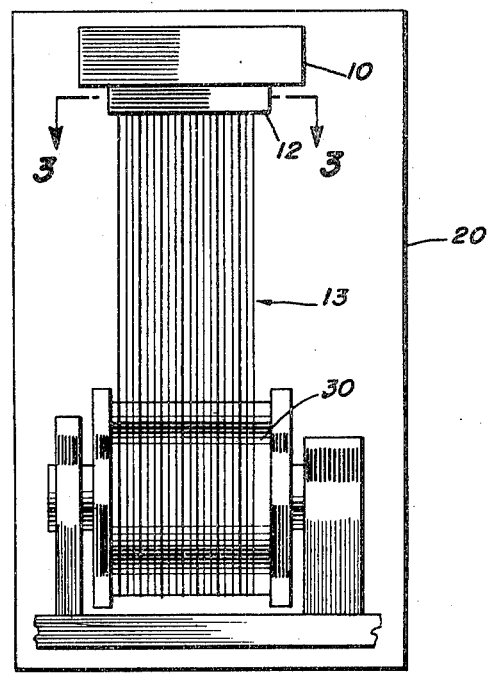
Figs. 1 and 2 are front and end elevation views, respectively, of apparatus applicable to the practice of the invention.
Figure 2:
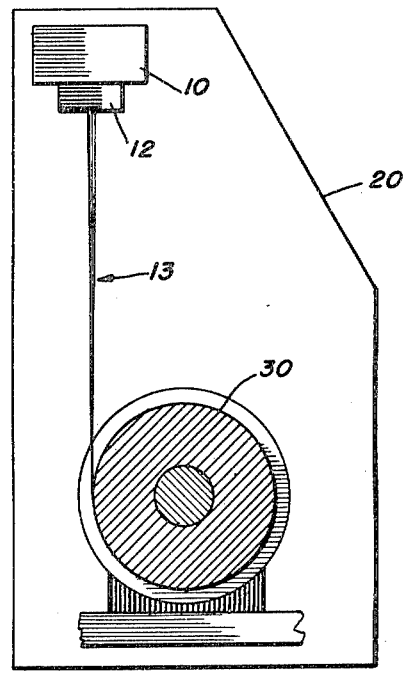
Figure 3:
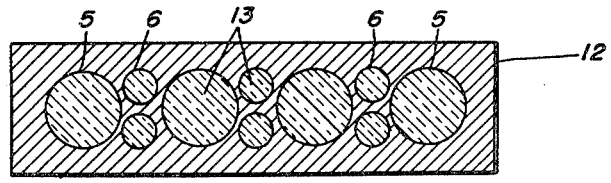
Fig. 3 is a plan view of the furnace bushing of Figs. 1 and 2, the orifice diameters being shown on a greatly magnified scale.

In Figs. 1 and 2 numeral 10 denotes a glass furnace containing molten glass. The glass is drawn as filaments 13 from a bushing 12 whose details are better shown in Fig. 3. Referring to said Fig. 3 the bushing is there shown as provided with a series of relatively large aligned orifices 5 and a series of smaller orifices 6 in staggered and interstitial relation to the orifices 5, but in sufficiently close proximity to maintain all orifices within the limits of a straight line having tangency with the larger orifices 5, so that the glass fibers 13 drawn through these orifices will all be disposed in a single array or sheet form and therefore will lie smoothly and evenly upon the cylindrical surface of the drum 30 (Figs. 1 and 2) after passing through the coating chamber 20 where they receive a coating of metal or other bond tolerating material, as described more fully in my copending application Serial No. 338,924, mentioned hereinbefore. The drum is motor driven in a manner well-known in the art. When the winding method has continued long enough to produce the desired number of layers of glass fibers upon the drum's surface, the drum's rotation is interrupted and the glass mat is removed therefrom by a longitudinal slitting operation, with the cutting instrument penetrating all layers. The method is repeated to form additional glass mats, after which the desired number of mats are superimposed and integrated with a liquid plastic material whereby the superimposed glass mats are converted into a unitary, glass-reinforced plastic board, or laminate, after the plastic binder material has had time to acquire a permanent set. In assembling successive mats to form the complete laminated board, the mats may be turned selectively to establish different angular relationships between the parallel fibers of one mat, and those of the mats immediately above and below. In this manner the strength of the completed board will be increased, and will approach uniformity of strength and resistance to bending or breaking forces applied thereto from any direction. Also, if desired, the successive glass-filled laminate may be interleaved with laminae of other compositions, such as plastic sheets having other kinds of reinforcing fabrics, or no reinforcing material whatever, so that in the completed board the glass-filled layers may be in spaced relationship, in a cross section through the board rather than contiguous.

Figure 4:
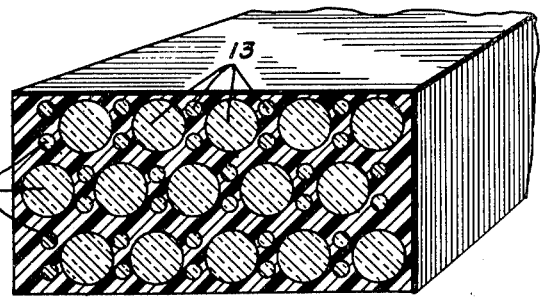
Fig. 4 is a similarly exaggerated sectional view of a plastic unit made by the method herein disclosed, utilizing the apparatus illustrated in Figs. 1, 2 and 3.

As each glass mat includes a plurality of layers of the glass fibers 13, it will be apparent that the drum 30 will make many revolutions before accumulating a sufficient thickness of glass to form one of the mats; and while the mat illustrated in Fig. 4 is shown as having only three such layers it is to be understood that this is a purely schematic illustration, and that actually there may be hundreds of layers of the filament 13 in each individual mat. The actual diameter of even the "relatively large" orifices 5 is on the order of just a few thousandths of an inch with that of the smaller orifices 6 being correspondingly less.

Obviously many modifications and variations of the present invention are possible in the light of the above teachings. It is therefore to be understood that within the scope of the appended claims the invention may be practiced otherwise than as specifically described.

What is claimed is:

1. The method of producing a glass-reinforced plastic article which comprises melting batch material to form a mass of molten glass, separating the mass into adjacently situated individual filaments of small and large cross-sectional areas, positioning the filaments of the smaller cross-sectional areas between the filaments of the larger cross-sectional areas to form a sheet of parallel substantially alined filaments of alternating cross-sectional areas, hardening the filaments in their arranged sheet position, winding said sheet to form a coil of a series of superimposed layers, slitting the coil longitudinally and reversely rolling it to form a mat, and impregnating the remaining spaces between the filaments with a plastic.

2. The method of producing a high glass content glass-reinforced laminated plastic article which comprises moving a mass of molten glass to a laminating area, separating the mass into adjacently situated independent filaments of alternate small and large cross-sectional areas, and simultaneously arranging the separated filaments so that the filaments of the smaller cross-sectional areas occupy the interstices between the filaments of the larger cross-sectional areas, hardening the filaments in their arranged positions, winding said filaments in their arranged positions to form a coil of a series of superimposed layers, slitting the coil longitudinally and reversely rolling it to form a mat, and impregnating the remaining spaces between the filaments with a plastic.

3. The method of producing a compact glass-reinforced laminated mat which comprises moving a mass of molten glass to a laminating area, separating the mass into adjacently situated independent filaments of small and large cross-sectional areas, and simultaneously positioning the filaments of the smaller cross-sectional areas between the filaments of the larger cross-sectional areas to form a sheet of parallel filaments of alternating cross-sectional areas, hardening the filaments in their arranged sheet position, and collecting a plurality of said sheets in superimposed relationship to form a mat.

4. The method of producing a compact glass-reinforced structure which comprises moving a mass of molten glass to a separating area, separating the mass into adjacently situated independent filaments of small and large cross-sectional areas, and simultaneously positioning a plurality of the filaments of the smaller cross-sectional areas between the filaments of the larger cross-sectional areas to form a sheet of parallel filaments of alternating cross-sectional areas, maintaining uniform spacing between the filaments throughout their lengths, and hardening the filaments in such uniformly spaced condition to provide a sheet.

5. The method of making a plastic article with a high glass reinforcing content comprising; forming a molten glass batch material, separating said batch material into continuous filaments of respectively small and large cross-sectional areas, arranging the small and large filaments in adjacent alternate parallel relationship to form a first sheet, drawing the continuous and arranged filaments to form a second sheet, positioning said second sheet upon said first sheet with the large filaments of said first sheet contiguous with the small filaments of said second sheet and vice versa to form a mat and impregnating said mat with a bonding material to produce a unitary article.

6. The method of producing a high glass content plastic article from a molten glass batch comprising; forming a plurality of glass fibers of respectively small and large cross-sectional areas, simultaneously arranging said fibers into a continuous film with the large and small fibers interspersed in alternate adjacent positions, placing said film upon a rotatable fiber drawing drum, accumulating successive lengths of the film upon said drum, simultaneously positioning said successive lengths of the film so that the large and small fibers thereof will lie adjacent the small and large fibers respectively of the next preceding length of film to form a mat, slicing the mat axially of the drum and impregnating the mat with a plastic to form a unitary article.

7. The method of producing a compact glass reinforced plastic structure comprising the steps of: arranging small and large glass fibers alternately substantially in line so that two small fibers will separate each large fiber to form a sheet, placing said sheet upon a rotatable fiber drawing drum, rotating said drum to form additional sheets of alternately placed small and large fibers, accumulating the additional sheets upon said drum in successive layers, simultaneously positioning the additional sheets to place the large fibers thereof in contiguous relation with respect to the small fibers of the next adjacent sheet to form a mat of different sized adjacent fibers in substantially parallel relationship, cutting the mat axially of the drum and impregnating said mat with a plastic to form a unitary structure.

References Cited in the file of this patent

UNITED STATES PATENTS

| | | |
|---|---|---|
| 2,262,871 | Whitehead | Nov. 18, 1941 |
| 2,408,713 | Webb | Oct. 1, 1946 |
| 2,461,094 | Taylor | Feb. 8, 1949 |
| 2,565,941 | Barnard | Aug. 28, 1951 |
| 2,574,221 | Modigliani | Nov. 6, 1951 |
| 2,699,415 | Nachtman | Jan. 11, 1955 |
| 2,728,699 | Labino | Dec. 27, 1955 |